US008416713B2

(12) United States Patent
Simons et al.

(10) Patent No.: US 8,416,713 B2
(45) Date of Patent: Apr. 9, 2013

(54) USE OF DECISION TREES FOR AUTOMATIC COMMISSIONING

(75) Inventors: Paul Richard Simons, Redhill (GB); Stephen Michael Pitchers, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/282,004

(22) PCT Filed: Mar. 5, 2007

(86) PCT No.: PCT/IB2007/050707
§ 371 (c)(1),
(2), (4) Date: Sep. 8, 2008

(87) PCT Pub. No.: WO2007/102112
PCT Pub. Date: Sep. 13, 2007

(65) Prior Publication Data

US 2009/0045971 A1 Feb. 19, 2009

(30) Foreign Application Priority Data

Mar. 6, 2006 (EP) .................................... 06110706

(51) Int. Cl.
*H04L 12/28* (2006.01)

(52) U.S. Cl. ........................................ 370/256; 702/150

(58) Field of Classification Search .................. 370/256
See application file for complete search history.

(56) References Cited

U.S. PATENT DOCUMENTS

| | | | | |
|---|---|---|---|---|
| 6,144,838 | A | 11/2000 | Sheehan | |
| 6,718,315 | B1 | 4/2004 | Meek et al. | |
| 2002/0044533 | A1 | 4/2002 | Bahl et al. | |
| 2002/0046018 | A1 | 4/2002 | Marcu et al. | |
| 2002/0126020 | A1 | 9/2002 | Wang et al. | |
| 2003/0232598 | A1 | 12/2003 | Aljadeff et al. | |
| 2004/0160199 | A1 | 8/2004 | Morgan et al. | |
| 2005/0228613 | A1 * | 10/2005 | Fullerton et al. | 702/150 |

FOREIGN PATENT DOCUMENTS

| | | | |
|---|---|---|---|
| EP | 1583401 | A1 | 10/2005 |
| WO | 0197466 | A1 | 12/2001 |

OTHER PUBLICATIONS

Sun et al. "Signal Processing Techniques in Network-Aided Positioning", Jul. 2005, IEEE Signal Processing Magazine.*

Hightower et al. "Location Systems for Ubiquitous Computing", Aug. 2001, IEEE.*

Fox et al. "A Probabilistic Approach to Collaborative Multi-Robot Localization", 2000, Kluwer Academic Publishers.*

(Continued)

*Primary Examiner* — Huy D Vu
*Assistant Examiner* — Joseph Bednash
(74) *Attorney, Agent, or Firm* — Larry Liberchuk

(57) ABSTRACT

A computer algorithm (36) employing decision trees in order to assign wireless communication nodes (12-19,39-43) in a derived spatial arrangement. In a first embodiment, the algorithm (36) assigns nodes to an array of positions corresponding to the positions of luminaires (2-9) in a lighting array (1) to enable the lighting array (1) to be commissioned automatically. In a second embodiment, the algorithm (36) assigns nodes to control groups (49-51) such that the member nodes of a particular control group (49-51) may be controlled by a single switch or sensor (46-48). The use of decision trees allows the final assignment of nodes to be delayed until more information has been taken into account, thus, the algorithm (36) is able to select the best overall configuration.

18 Claims, 19 Drawing Sheets

OTHER PUBLICATIONS

Liu et al "Efficient Localized Localization Algorithm for Wireless Sensor Networks", 2005, IEEE.*
Thrun et al. "Monte Carlo Hidden Markov Models: Learning Non-Parametric Models of Partially Observable Stochastic Processes", 1999, In Proc. of the International Conference on Machine Learning (ICML).*
Chen "A Non-Line-of-Sight Error Mitigation Algorithm in Location Estimation", 1999, IEEE.*
Reid, "An Algorithm for Tracking Mulltiple Targets.", Dec. 6, 1979, IEEE Transactiosn on Automatic Control.*
Sayed et al. "Network-Based Wireless Location", Jul. 2005, IEEE Signal Processing Magazine.*
Donald B, Reid: An Algorithm for Tracking Multiple Targets, IEEE Transactions on Automatic Control, vol. AC-24, No. 6, Dec. 1979, pp. 843-854.

* cited by examiner

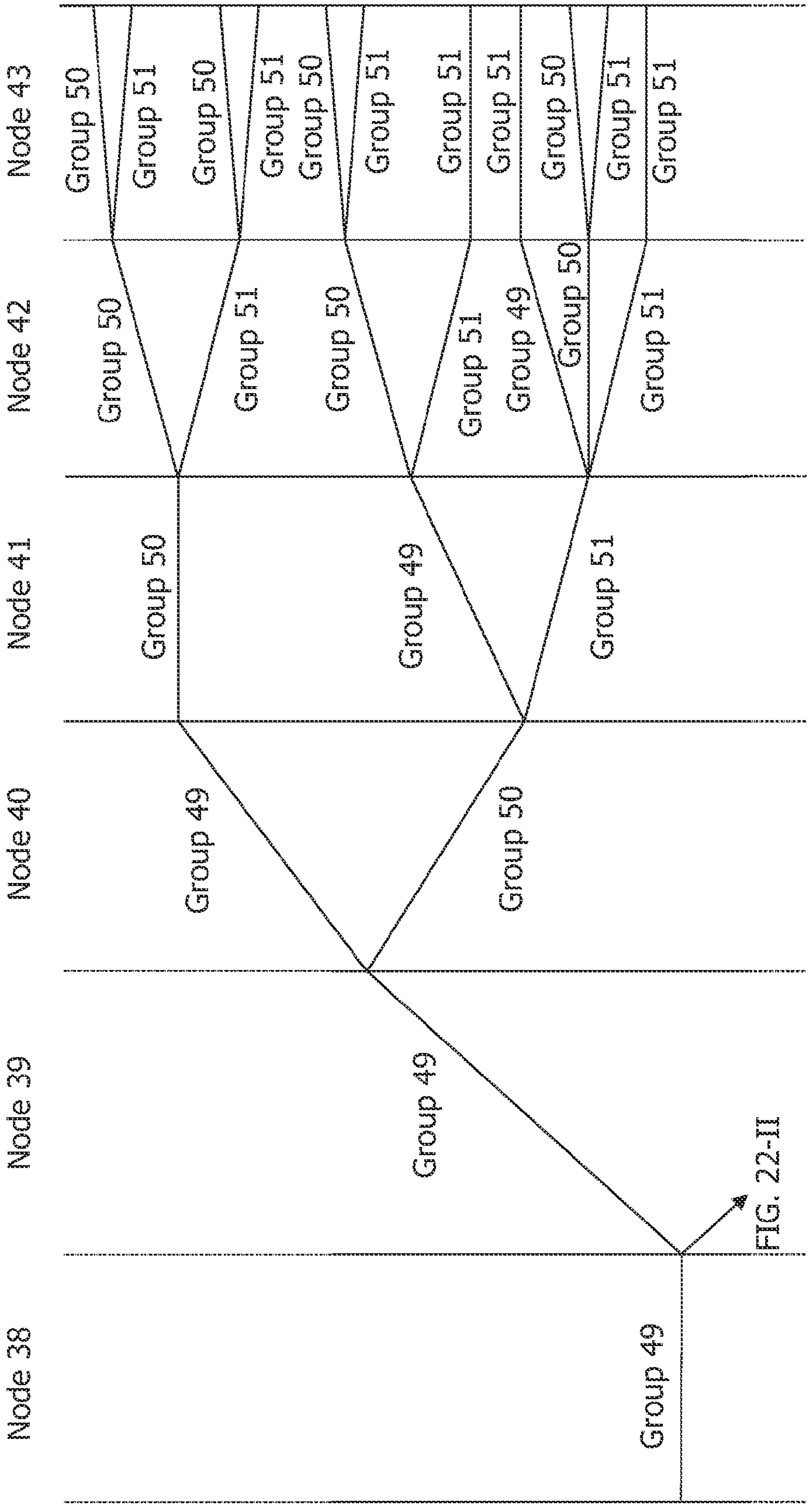
FIG. 22-I

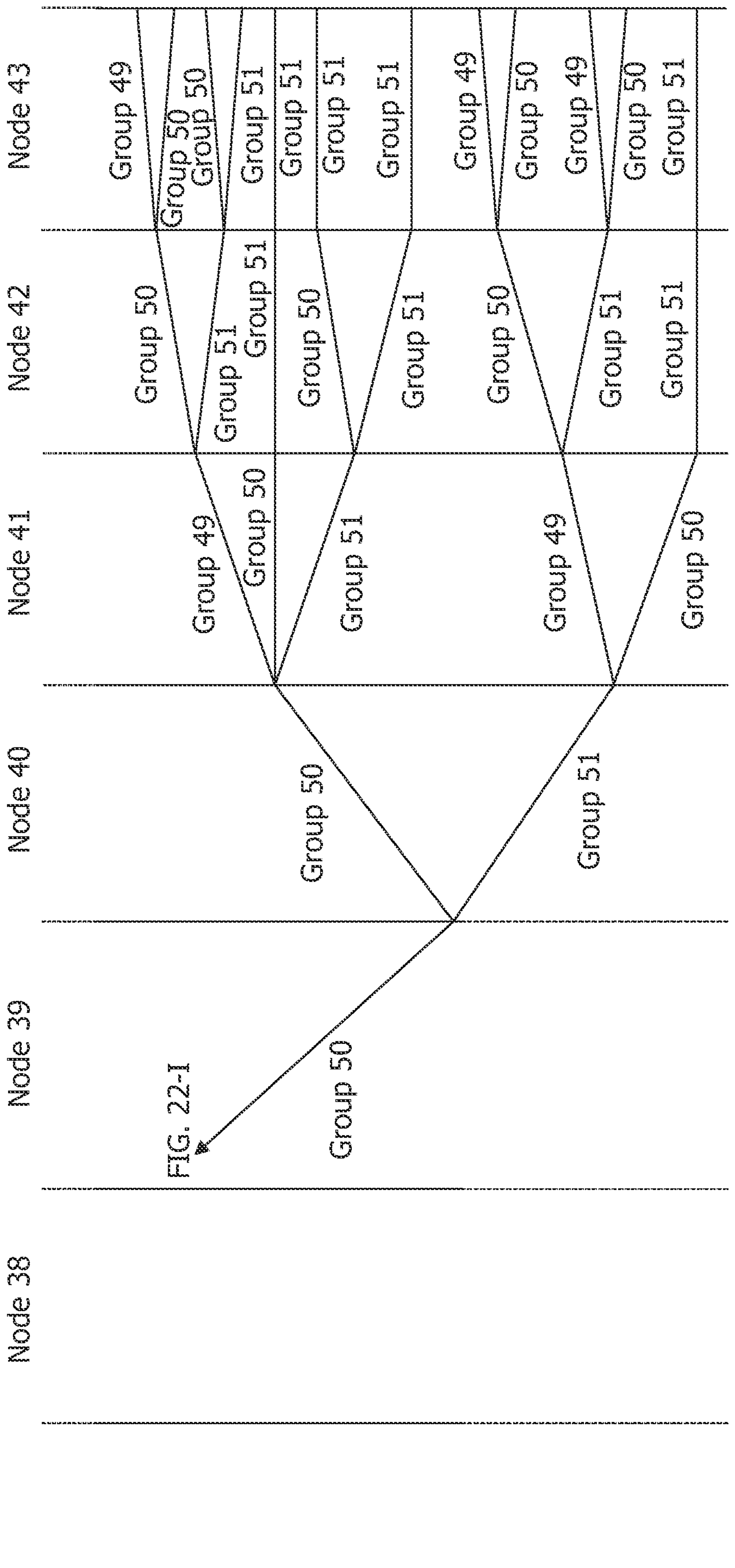
FIG. 22-II

| Node 38 | Node 39 | Node 40 | Node 41 | Node 42 | Node 43 |
|---|---|---|---|---|---|
| Group 49 | Group 50 | Group 50 | Group 49 | Group 50 | Group 51 |

USE OF DECISION TREES FOR AUTOMATIC COMMISSIONING

FIELD OF THE INVENTION

The present invention relates to the automatic assignment of nodes to their correct spatial positions and, particularly, to the automatic assignment of nodes to their correct spatial positions within a wirelessly controlled lighting array.

BACKGROUND OF THE INVENTION

A typical wireless lighting array comprises a large number of electrically driven luminaires, which are typically arranged in a regular structure in order that they provide an even level of background light. The luminaires within the array are often laid to a grid or lattice arrangement such that there is uniform spacing between them. The grid or lattice arrangement may, for example, be dictated by the structure of a false ceiling.

Each of the individual luminaires in such a lighting array is adapted such that it is able to communicate with the other luminaires over a wireless communication network, which is formed by an array of associated communication nodes. Each of the communication nodes in the network is located at the position of its associated luminaire in the lighting array. Hence, the spatial structures of the lighting array and communication network are equivalent.

The communication network provides a means by which the lighting array can be auto-commissioned post-installation. However, the individual nodes in the network are unable to provide their own position information, therefore, it is unknown which luminaire each communication node is associated with. Before the array can be commissioned, the spatial position of each node in the communication network must be established so that each node can be assigned to the correct luminaire.

The positions of the communication nodes are found by a trilateration process, which is based upon range data provided by the wireless communication network. The range data is provided in the form of range measurements taken between pairs of communication nodes in the wireless network. The calculation of a range between two nodes is derived directly from these range measurements, which are made using techniques like Received Signal Strength Indication (RSSI) or Time-of-Flight.

In the case of RSSI, the received strength of a radio signal exchanged between a pair of communication nodes is used to calculate the range between them. The strength of the transmitted signal decreases at a rate inversely proportional to the distance traveled and proportional to the wavelength of the signal. Hence, taking the wavelength into account, the distance between the pair of nodes may be calculated from the transmitted signal's attenuation at the receiving node.

In the case of Time-of-Flight measurements, the range between a pair of communication nodes is calculated by measuring the time taken for a radio signal to travel between them. It is known that radio signals travel at the speed of light, hence, an accurate measure of the time-of-flight between the pair of nodes enables an accurate calculation of the distance between them.

However, these types of range measurement are subject to error and, hence, the derived positions of the communication nodes often do not match exactly to positions on the grid or lattice arrangement on which the luminaires are arranged. There is, therefore, still some uncertainty as to which luminaire each node is associated with.

In order for the wireless lighting array to be successfully commissioned, the communication nodes must be assigned to their correct grid or lattice position, and hence luminaire, in the lighting array. If the communication nodes are assigned to a lattice position which does not correspond to their actual lattice position, the derived spatial structure of the communication network will be incorrect and, consequently, the lighting array will not function correctly.

In order to resolve such uncertainties in the positions of the communication nodes, the positions derived by trilateration may be compared with a template which defines the lattice positions of the luminaires in the lighting array. By this method, a communication node can be "snapped" to the closest luminaire to its derived position. Its new position can then be used as a reference point in the trilateration of further communication nodes. In this way, errors in the positions derived by the trilateration process are not accumulated.

However, there is a risk, with the above method, that individual communication nodes will be snapped to the wrong position, i.e. a position which does not correspond to their actual position. In this case, the use of that position to establish the positions of further communication nodes results in the accumulation of large errors. Such errors may become sufficiently large that they prevent the overall topology of the lighting array from being established.

SUMMARY OF THE INVENTION

It is an object of the present invention to improve on known systems and methods.

According to a first aspect of the invention, there is provided a method of assigning wireless nodes in a derived spatial arrangement to positions in an array of known positions, comprising building a decision tree to represent a hypothesis for the assignment of the first of the nodes to a first of the positions, extending the decision tree to represent hypotheses for the assignment of each further node to a plurality of the positions, assigning a probability to each of the hypotheses, selecting one of the positions for each of the nodes based upon the probability of the hypotheses and assigning each of the nodes to its selected position.

According to a second aspect of the invention, there is also provided a method of assigning wireless nodes in a derived spatial arrangement to groups, comprising building a decision tree to represent a hypothesis for the assignment of a first of the nodes to a first of the groups, extending the decision tree to represent hypotheses for the assignment of each further node to a plurality of the groups, assigning a probability to each of the hypotheses, selecting one of the groups for each of the nodes based upon the probabilities of the hypotheses and assigning each of said nodes to its selected group.

The hypothesis for the assignment of the first node is carried by a root of the decision tree and the hypotheses for the assignment of each further node are carried by branches of the decision tree which stem from the root.

The hypothesis for the assignment of the first node acts as a parent to the hypotheses for the assignment of the second node such that the probability of each hypothesis for the assignment of the second node is calculated as the product of the probability of the hypothesis for the first node and the probability of the hypothesis for the second node against its sibling hypotheses representing the assignment of the second node to alternative positions.

The hypotheses for the assignment of the second node act as parents to the hypotheses for the assignment of the third node such that the probability of each hypothesis for the third node is calculated as the product of the probability of its parent hypothesis and the probability of the hypothesis against its sibling hypotheses representing the assignment of the third node to alternative positions.

Branches of the decision tree which carry hypotheses with a probability less than a defined threshold value, or which do not conform to defined assignment rules, are pruned out of the tree.

BRIEF DESCRIPTION OF THE DRAWINGS

Embodiments of the present invention will now be described, by way of example, with reference to the accompanying drawings, in which:

FIG. 22 is an illustration of a decision tree representing the assignment of all nodes in a wireless network to control groups.

DETAILS OF THE INVENTION

Figure 1:
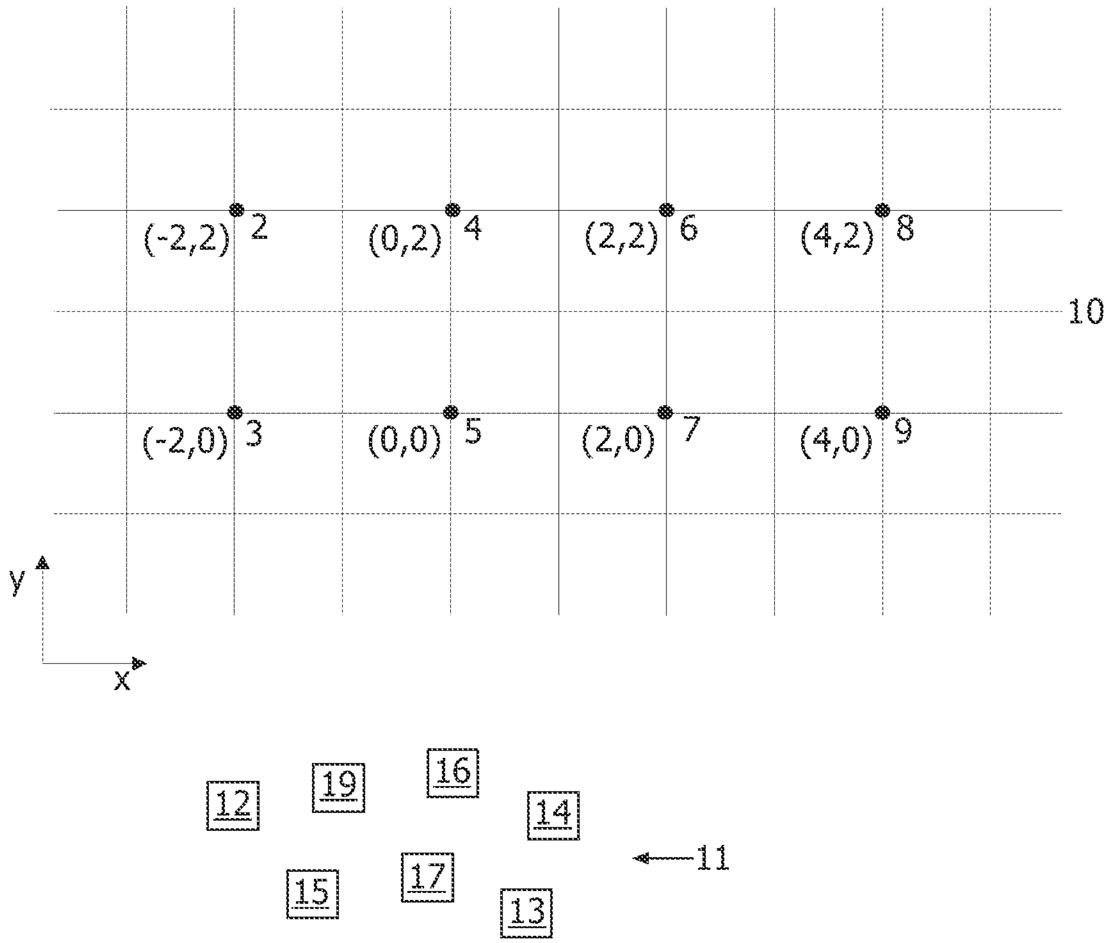
FIG. 1 is a diagram illustrating the nodes of a wireless communication network and the luminaires of a section of a lighting array.

Referring to FIG. 1, a section of a wireless lighting array 1 comprises electrically driven luminaires 2-9, which are arranged on a lattice 10. The intersections of the lattice 10 define an arbitrary x-y coordinate scale. However, in another embodiment of the invention, the luminaires 2-9 may be arranged in x-y-z space. The luminaires are adapted to communicate with one another through a wireless communication network 11, which comprises communication nodes 12-19. Each of the communication nodes 12-19 comprises, for example, a ZigBee-like radio module, and is associated with one of the electrically driven luminaires 2-9.

Figure 2:
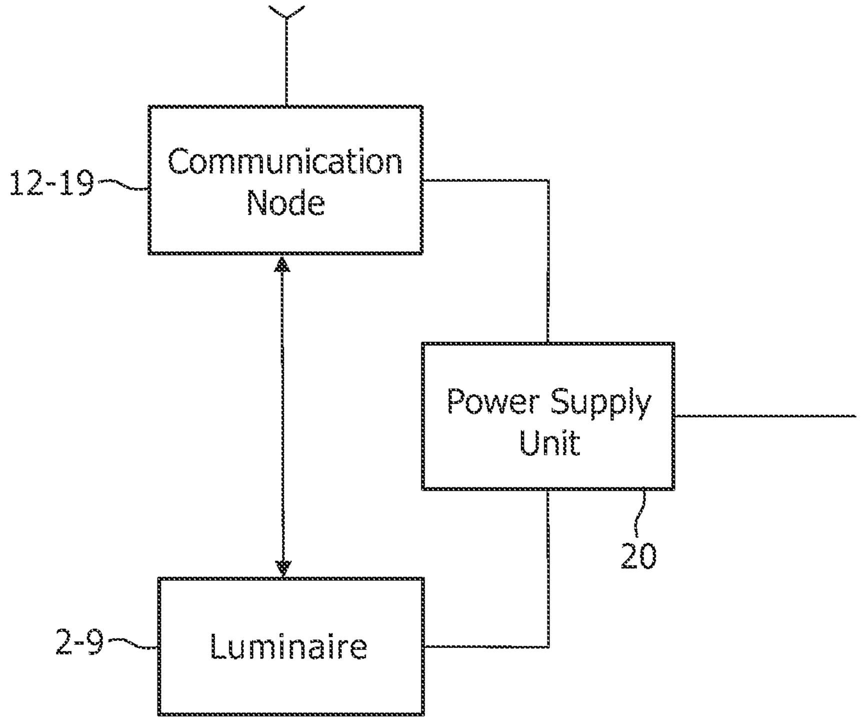
FIG. 2 is a block diagram of the hardware present at each luminaire position, comprising a power supply unit, a wireless communication node and a luminaire.

Referring to FIG. 2, the hardware present at each luminaire position comprises a power supply unit 20, a wireless communication node 12-19 and a luminaire 2-9. The power supply unit 20 is adapted to provide electrical power to the communication node 12-19 and to the luminaire 2-9. The power supply unit 20 may be connected to a mains power supply and may comprise electrical components such as transformers for manipulating the mains supply.

The first stage in commissioning the lighting array 1 is to establish the communication network 11. This is achieved by a network discovery process, which is initiated by all communication nodes 12-19 upon power-up. Every communication node 12-19 in the network 11 tunes to a control channel and broadcasts an “advertise” message, which contains its node type and a request that all other nodes identify themselves. After a random time, each other node replies to the message with its identity and functionality. However, the nodes 12-19 are unable to supply their position information. At this stage, therefore, the spatial structure of the network 11 is unknown.

Figure 3:
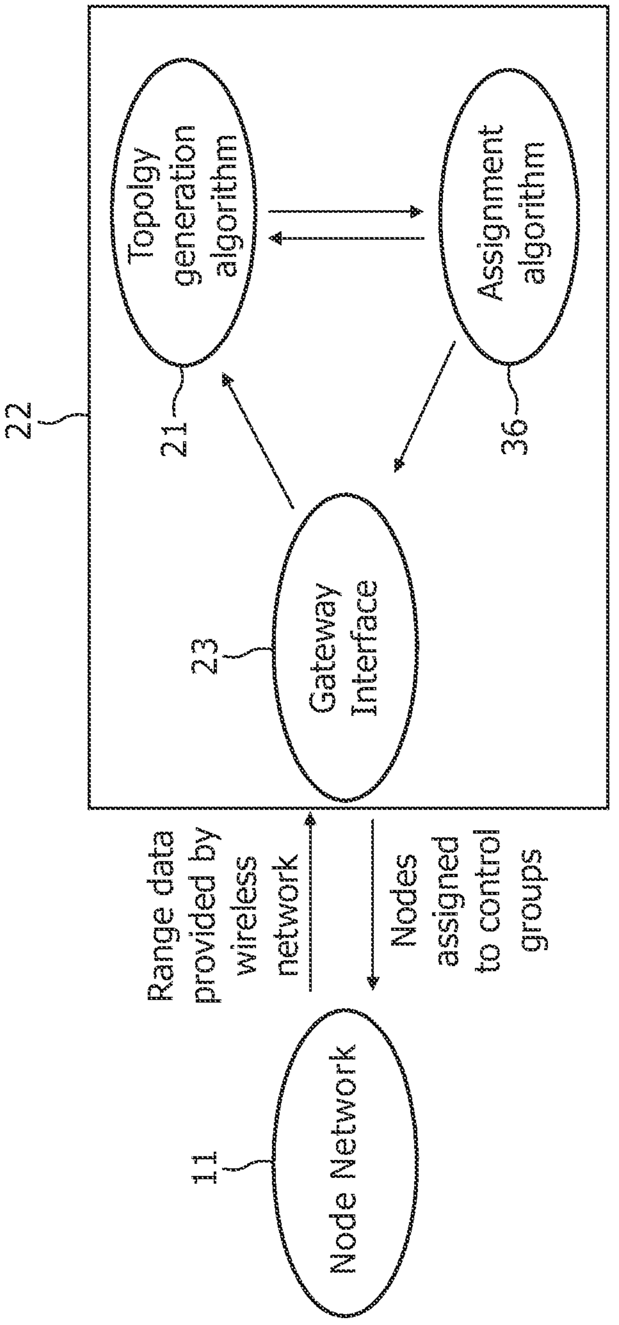
FIG. 3 is a diagram showing the implementation of a placement algorithm and an assignment algorithm according to the present invention.

Referring to FIG. 3, the positions of the nodes 12-19 in the network 11 may be established with the use of a placement algorithm 21. The placement algorithm 21 is configured to calculate the relative position of each node 12-19 using range data provided by the wireless communication network 11. The range data is provided in the form of range measurements taken between pairs of communication nodes 12-19 in the wireless network 11. The calculation of a range between two nodes is derived directly from these range measurements, which are made using techniques like Received Signal Strength Indication (RSSI) or Time-of-Flight as previously discussed.

The placement algorithm 21 is adapted such that it may be implemented, for example, by a laptop computer 22 or PDA which communicates with the wireless network 11 through a gateway interface 23.

The gateway interface 23 comprises a stand-alone program, running on the computer 22, which requests and collects data from the communication network 11 through a gateway provided by one of the communication nodes 12-19. The collected data includes the functionality of each node 12-19 and range measurements between each pair of nodes 12-19. The gateway interface 23 continuously monitors the network 11 and is configured to detect if new nodes are added to, or disappear from, the network 11.

Figure 4:
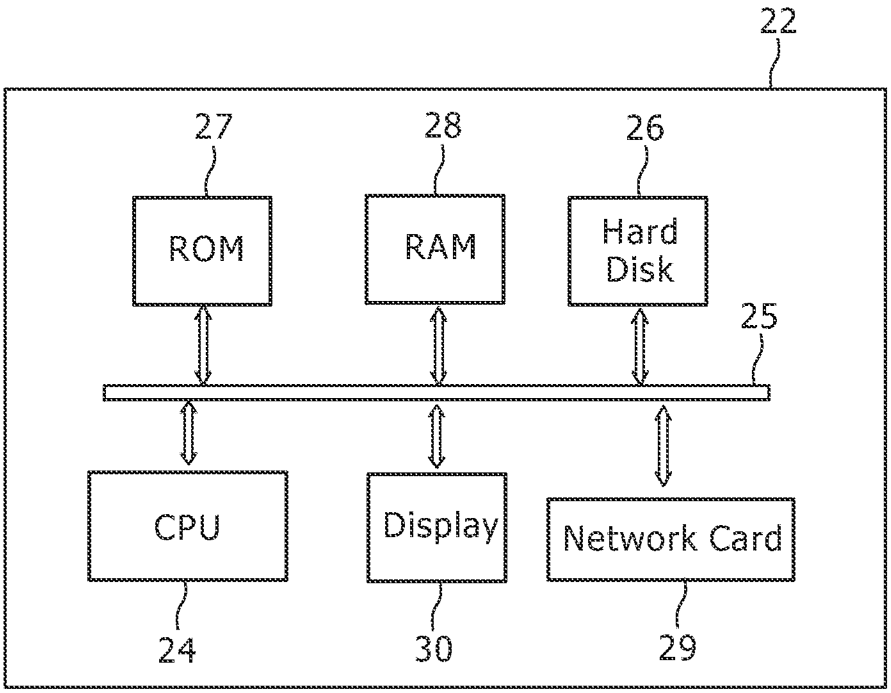
FIG. 4 is a block diagram showing a computer architecture configured to implement an assignment algorithm according to the present invention.

Referring to FIG. 4, the hardware of the computer 22 includes a central processing unit (CPU) 24 for executing the placement algorithm 21 and for managing and controlling the operation of the computer 22. The CPU 24 is connected to a number of devices via a bus 25, the devices including a storage device, for example a hard disk drive 26, and memory devices including ROM 27 and RAM 28. The computer hardware further includes a network card 29, which provides means for interfacing to the communication network 11, and a display 30, which allows a user to monitor the operation of the computer 22.

The computer 22 is adapted to communicate with the gateway via a serial or Ethernet cable. However, in another embodiment of the invention, the computer 22 may communicate with the gateway wirelessly.

In a further embodiment of the invention, the placement algorithm 21 is adapted such that it may be implemented by computer hardware which is integrated into the wireless communication network 11. Such hardware could be comprised, for example, as part of the communication nodes 12-19.

Again referring to FIG. 3, in commissioning the lighting array 1, the computer 22 requests and receives range data from the wireless communication network 11 through the gateway provided by one of the communication nodes 12-19. The computer 22 then uses the range data to implement the placement algorithm 21.

Figure 5:
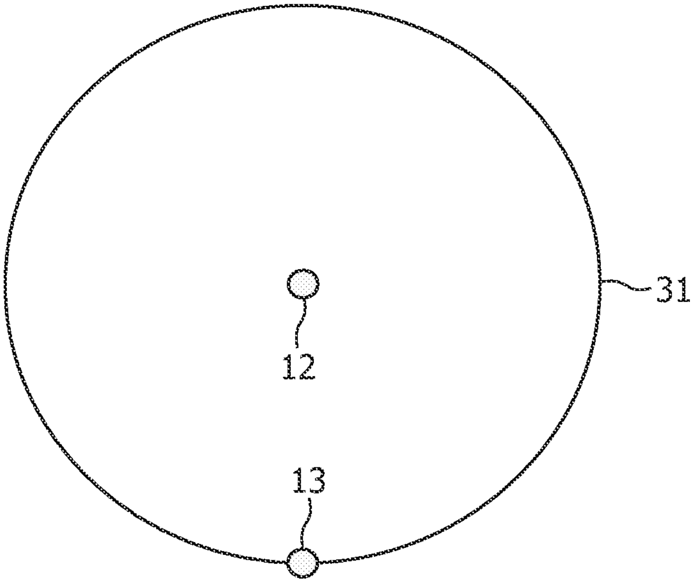
FIG. 5 is a first illustration of the method by which a placement algorithm derives the structure of a wireless communication network.
Figure 6:
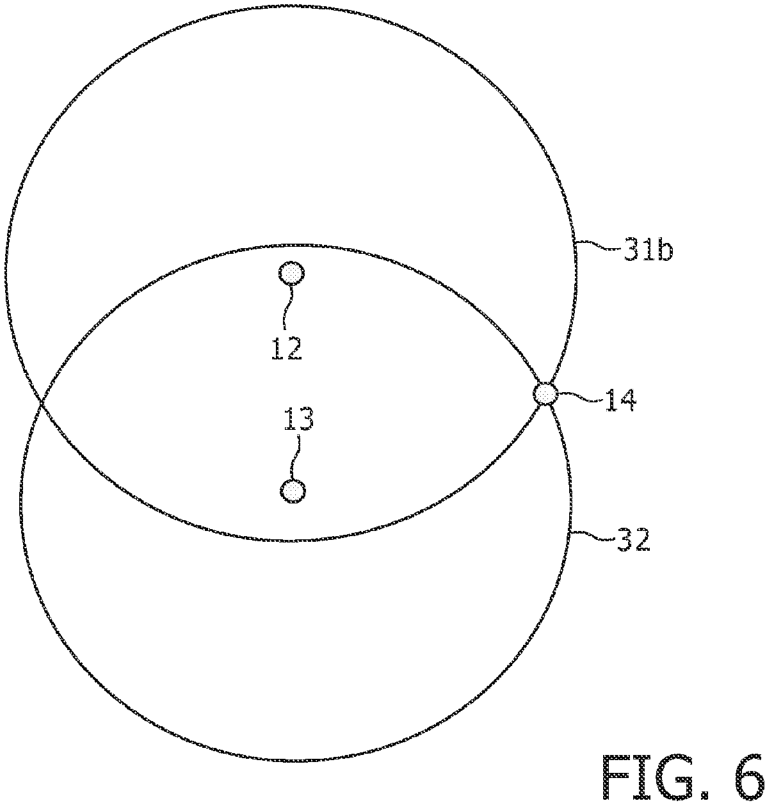
FIG. 6 is a second illustration of the method by which a placement algorithm derives the structure of a wireless communication network.
Figure 7:
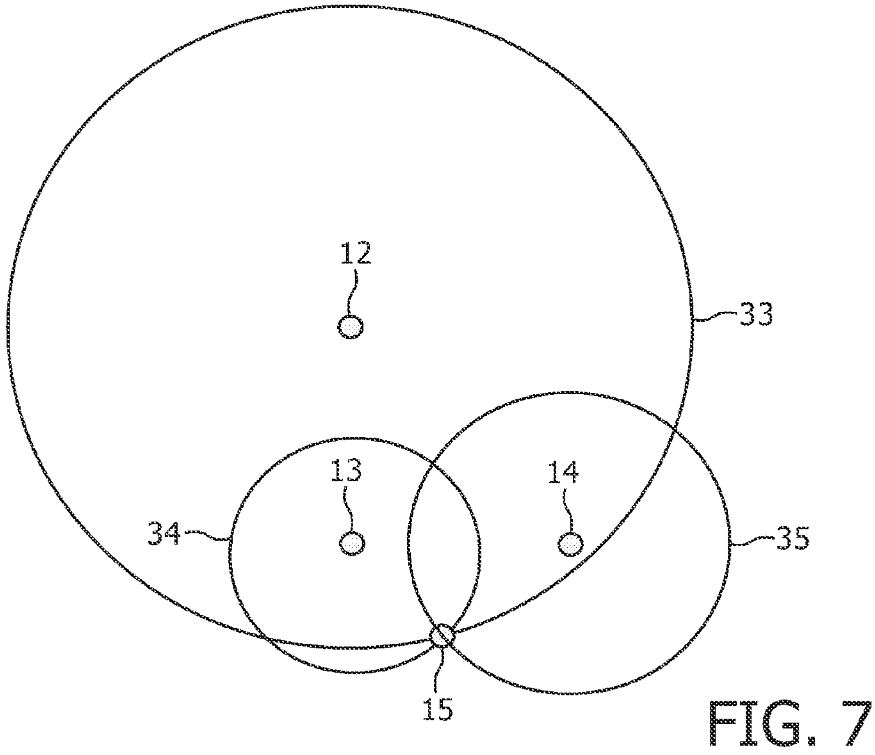
FIG. 7 is a third illustration of the method by which a placement algorithm derives the structure of a wireless communication network.

FIGS. 5-7 illustrate the method by which the placement algorithm 21 uses range measurements to derive the positions of the first four nodes 12-15 in the network 11, as shown in FIG. 1. Referring to FIG. 5, following the collection of range data, the placement algorithm 21 selects the first node 12 in the network 11 and assigns it, nominally, to the position of the first luminaire 2 in the lighting array 1 at coordinates (−2,2).

The placement algorithm 21 then constructs a circle 31 around the first node 12, the radius of which is defined by the range measurement between the first node 12 and the second node 13. The placement algorithm 21 may then use the circle 31 to assign the second node 13 to its closest luminaire 3 at coordinates (−2,0).

Referring to FIG. 6, the placement algorithm 21 is configured to construct a second circle 32 around the position of the second node 13. The radius of the second circle 32 is defined by the range measurement between the second node 13 and third node 14. The placement algorithm 21 constructs a further circle 31*b* around the first node 12 to define the distance between the first node 12 and third node 14.

The circles 31*b*,32 intersect at two points, providing two possible placement positions for the third node 14. The placement algorithm 21 assesses the likelihood of each position based upon its distance from the positions of surrounding luminaires. It is then able to select the best position for the third node 14, corresponding to the position shown in FIG. 6 and FIG. 8.

The placement algorithm 21 may then use the derived position of the third node 14 to assign it to its closest luminaire 5 at coordinates (0,0).

Once a derivation of position for every node in the network has been completed, the resultant topology may be reflected or rotated in order to ascertain the correct orientation.

The placement algorithm 21 may then position the fourth node 15 by making three final range measurements. These are made between the first node 12 and fourth node 15; between the second node 13 and fourth node 15; and between the third node 14 and fourth node 15. Referring to FIG. 7, the ranges between the nodes are defined by the radii of circles 33,34,35 respectively and the fourth node 15 is placed at their intersection.

However, these types of range measurement, which are used in order to calculate the distances between nodes 12-19, can be affected by factors such as temperature and node battery level. In addition, there may be errors introduced due to component differences, variations in antenna performance and multipath effects. Such errors are propagated when calculating the ranges between pairs of communication nodes 12-19 and, hence, lead to a level of uncertainty in the derived node positions.

Figure 8:
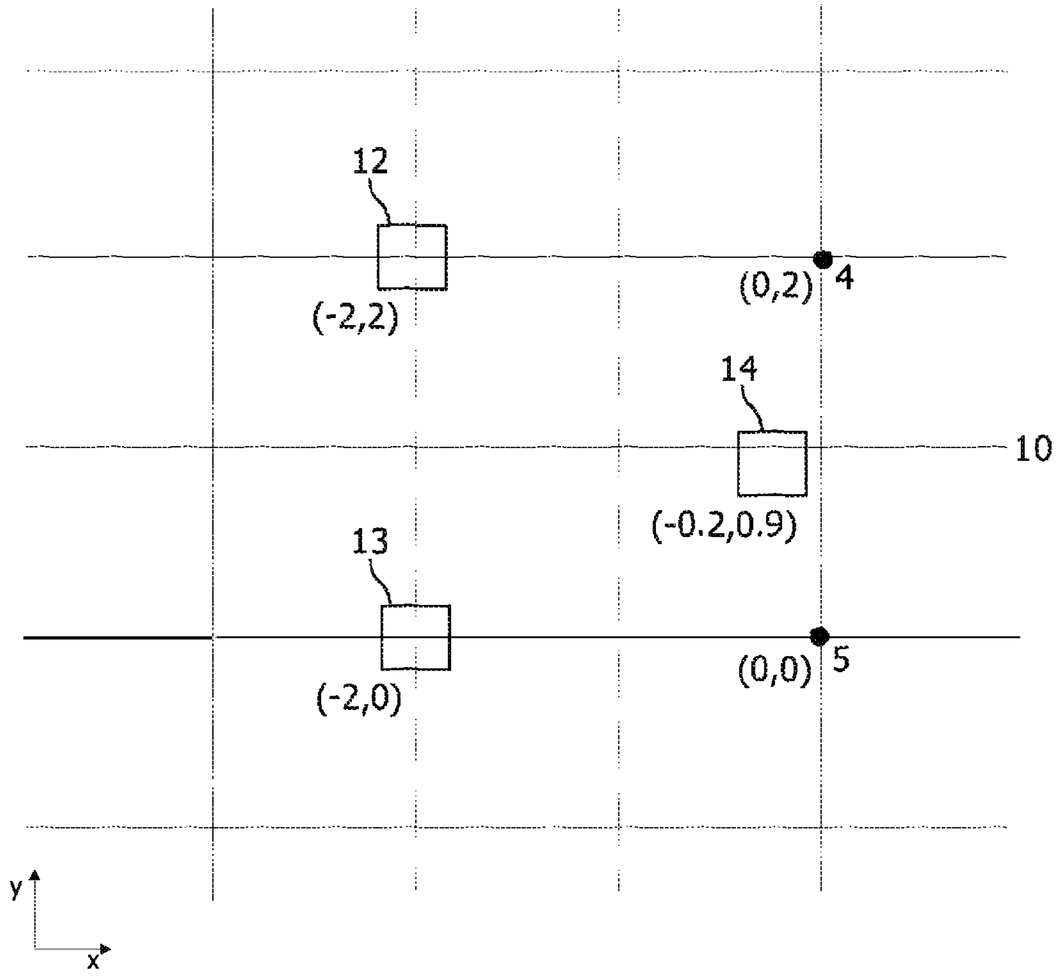
FIG. 8 is a first diagram illustrating a section of the derived structure of a wireless communication network.

FIG. 8 shows an example of this type of uncertainty corresponding to the derivation of structure described with reference to FIGS. 5-7. The first two communication nodes 12,13 in the network 11 are assigned to known positions (−2,2) and (−2,0) on the lattice 10, corresponding to the positions of luminaires 2,3. These nodes 12,13 are used as reference points to derive the position of the third node 14 at coordinates (−0.2,0.9).

Figure 9:
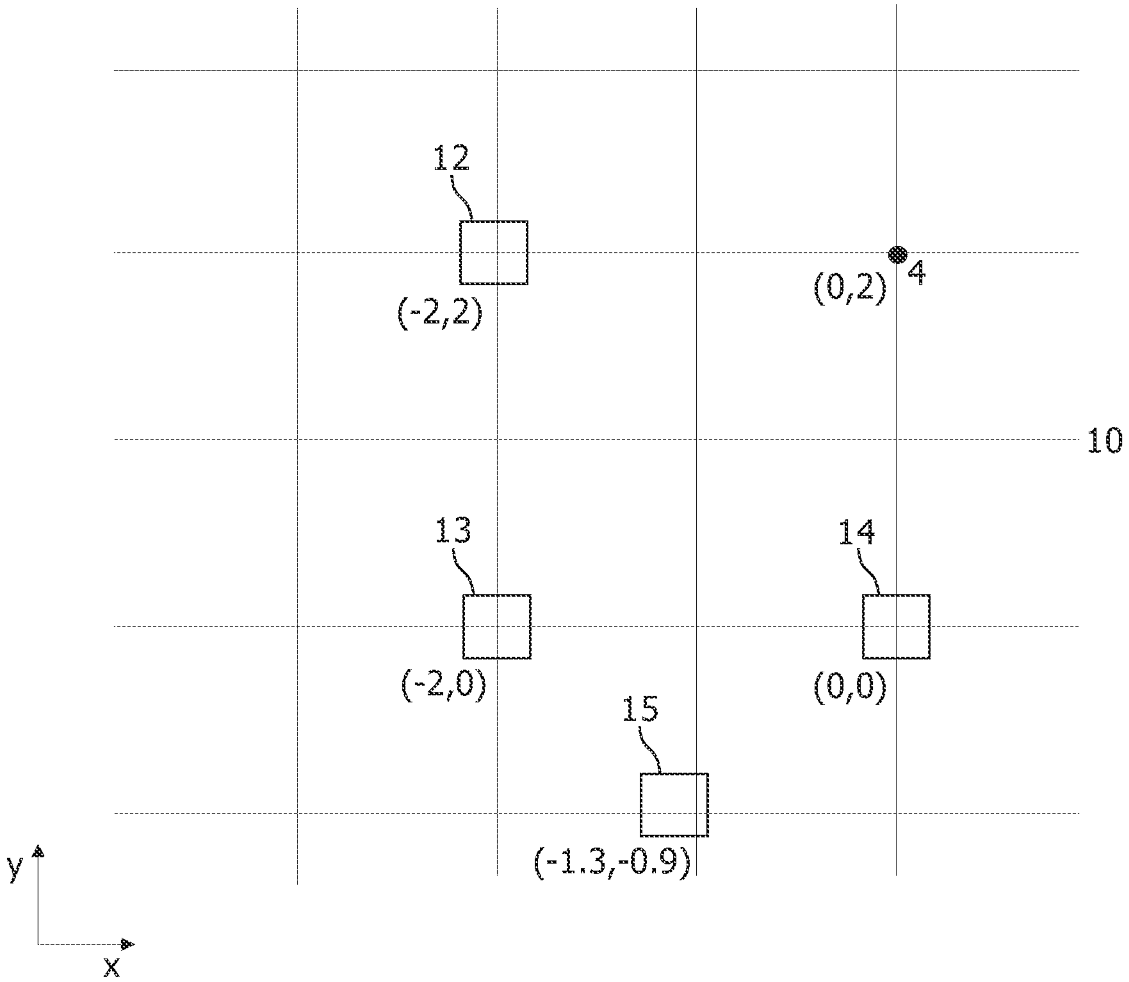
FIG. 9 is a second diagram illustrating a section of the derived structure of a wireless communication network.

Referring to FIG. 9, the placement algorithm 21 assigns the third node 14 to its closest luminaire 5 at coordinates (0,0). Its position is then used in the trilateration of the position of the fourth node 15, which is derived at coordinates (−1.3,−0.9), corresponding to the process shown in FIG. 7.

However, the closest available luminaire 4 to the derived position of the fourth node 15 is located at coordinates (0,2). This makes the distance between the node 15 and the luminaire 4 very large and, therefore, despite the third node 14 being assigned to the luminaire 5 closest to its derived position, the probability of the overall assignment combination being correct is very low.

Figure 10:
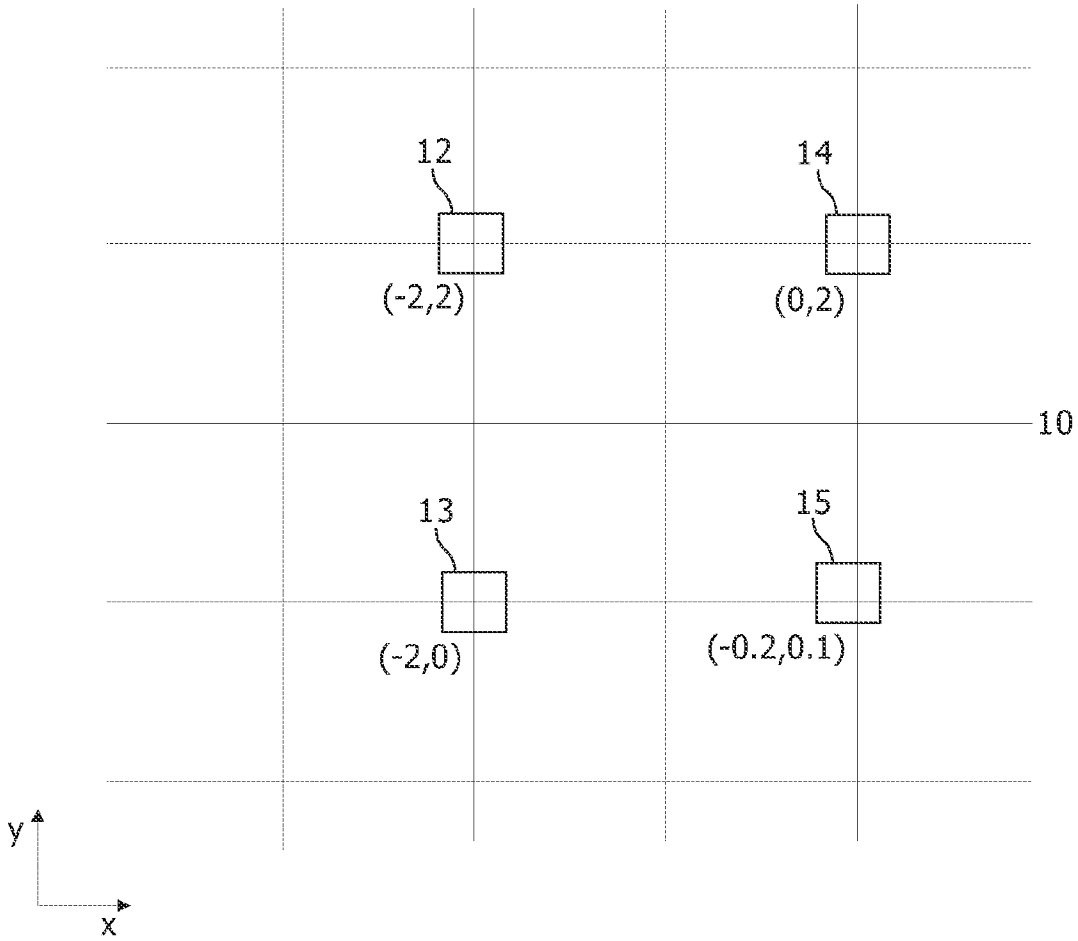
FIG. 10 is a third diagram illustrating a section of the derived structure of a wireless communication network.

Alternatively, referring to FIG. 10, if the third node 14 is assigned to its second closest luminaire 4, the position of the fourth luminaire 15 is derived to be at coordinates (−0.2,0.1). With this assignment combination, the distance between the fourth node 15 and its closest available luminaire 5, at coordinates (0,0), is very small and, hence, the probability of the overall assignment combination being correct is very high. This example illustrates the potential problems associated with the immediate assignment of communication nodes 12-19 to their closest available luminaire 2-9.

In accordance with the invention, an assignment algorithm 36 is provided, shown in FIG. 3, which overcomes the problems associated with immediate node assignment by effectively taking into account a plurality of assignment decisions simultaneously. In this way, the algorithm 36 is able to determine the best overall assignment solution for the node network 11.

In order to simultaneously consider a plurality of assignments, the algorithm 36 represents the assignment of the nodes 12-19 in a decision tree. Each branch of the decision tree represents a hypothesis for the assignment of a particular node 12-19 to a particular luminaire 2-9, and each hypothesis is assigned a probability.

The decision tree begins with the construction of a root, which carries a hypothesis for the assignment of the first node 12 in the network 11. The decision tree then constructs branches to carry hypotheses for the assignment of the second node 13 in the network 11. These branches stem from the root and their hypotheses are represented as children of the hypothesis for the assignment of the first node 12, and as siblings of each other. The hypothesis for the assignment of the first node 12 may then be referred to as the parent of the hypotheses representing the assignment of the second node 13.

Figure 11:
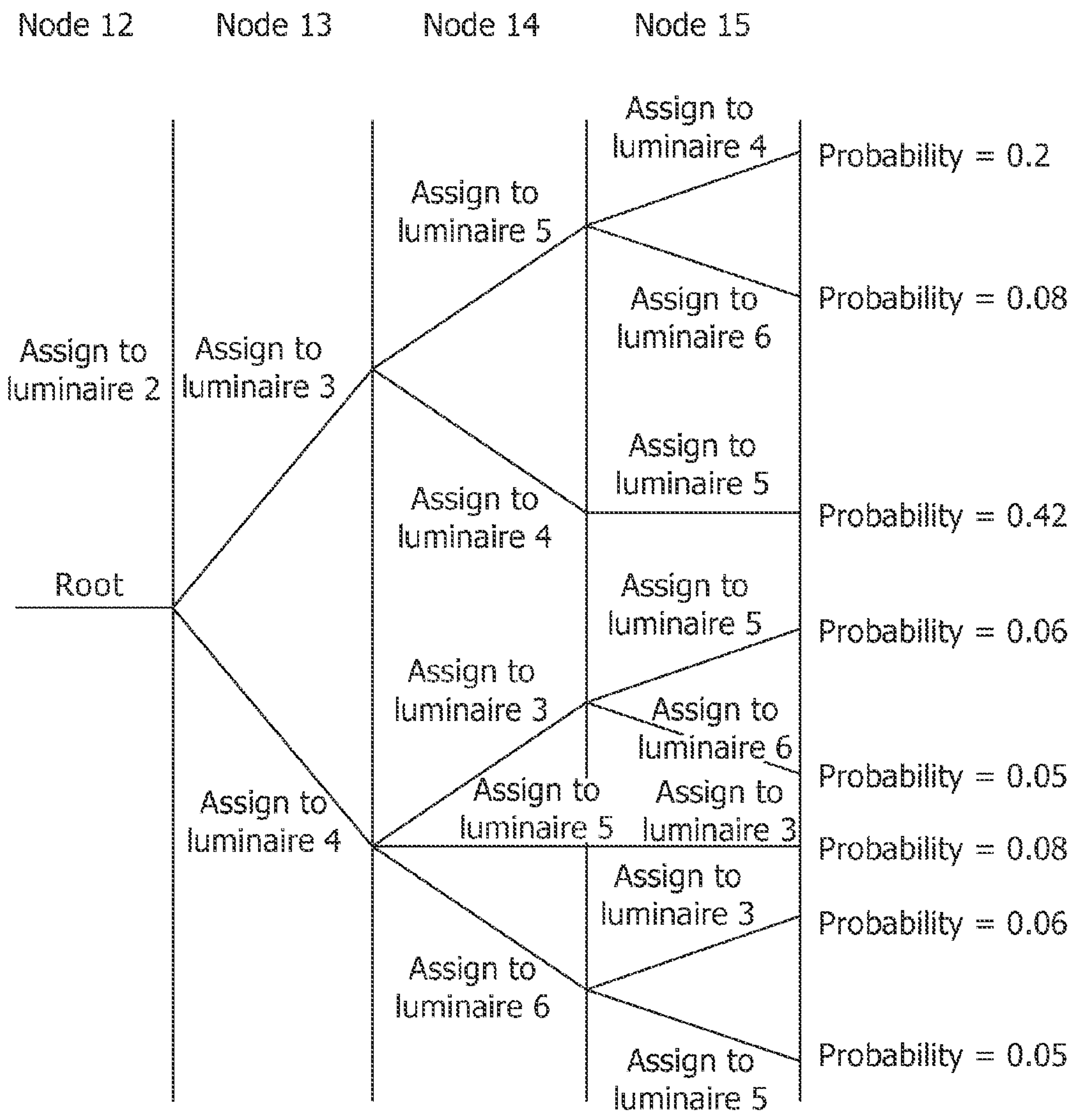
FIG. 11 is an illustration of a decision tree representing the assignment of a first four communication nodes in a wireless communication network to the positions of luminaires in a lighting array.

FIG. 11 shows the beginnings of such a decision tree by illustrating assignment hypotheses for the first four communication nodes 12-15 in the network 11.

Figure 12:
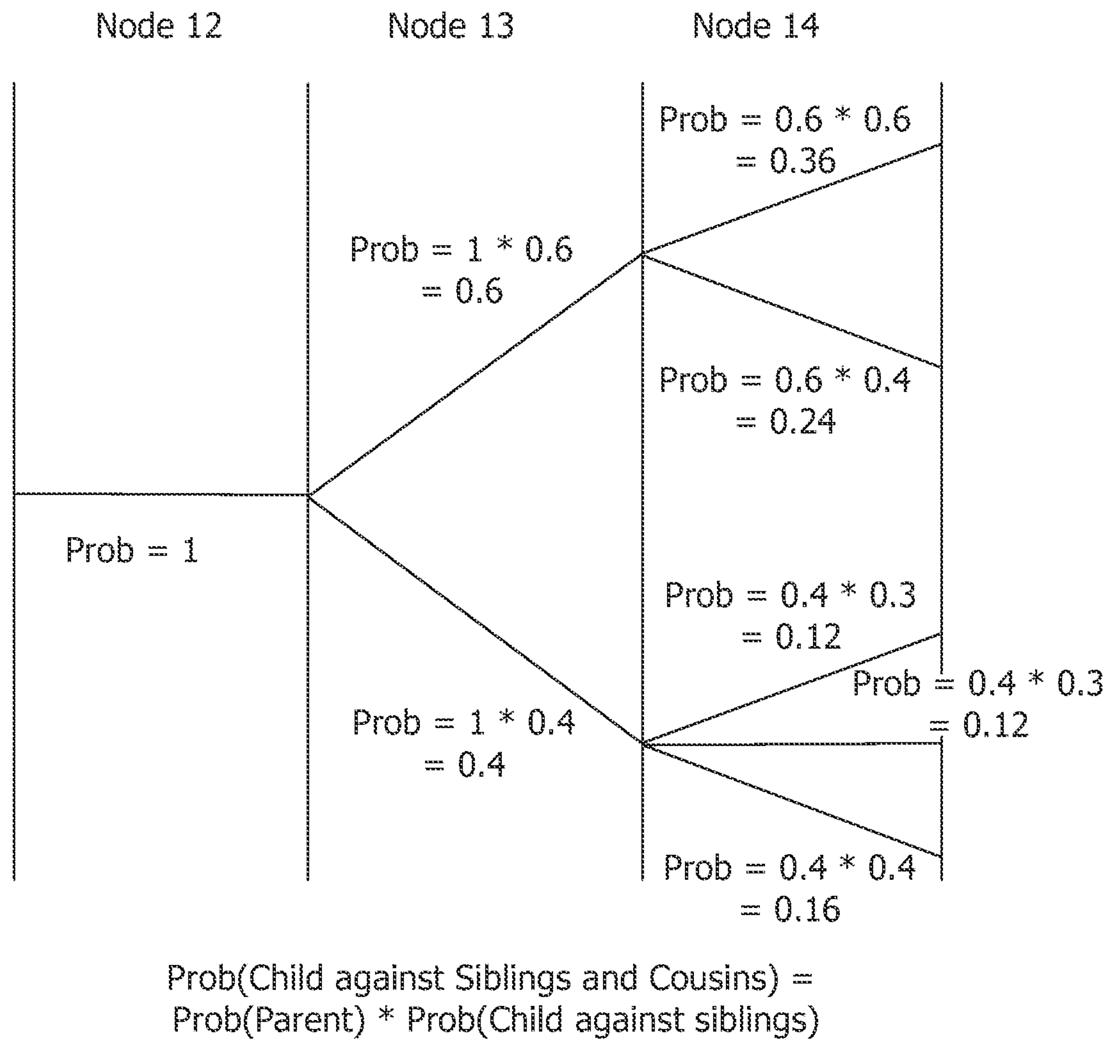
FIG. 12 is an illustration of a section of the decision tree of FIG. 11 showing how the probabilities of hypotheses may be calculated.

The probability of each child hypothesis incorporates the probability of its parent. Therefore, as an example, if a parent hypothesis has a probability of 0.6, and the likelihood of a child hypothesis against its siblings is 0.4, the child hypothesis has a probability of 0.6*0.4=0.24. An example of this is shown in FIG. 12, which corresponds to the assignment of the first three nodes shown in FIG. 11. Once multiplied by the probabilities of their parents, the probabilities for each generation of hypotheses, i.e. all sibling and cousin hypotheses, sum to 1.

In order to prevent such decision trees from growing exponentially due to a combinatorial explosion of possible assignments, the assignment algorithm 36 regularly prunes out the branches carrying the least likely hypotheses. Additionally, certain combinations of assignment may be found to be mutually exclusive, in which case the algorithm 36 causes the relevant hypothesis or hypotheses to be blocked.

Figure 13:
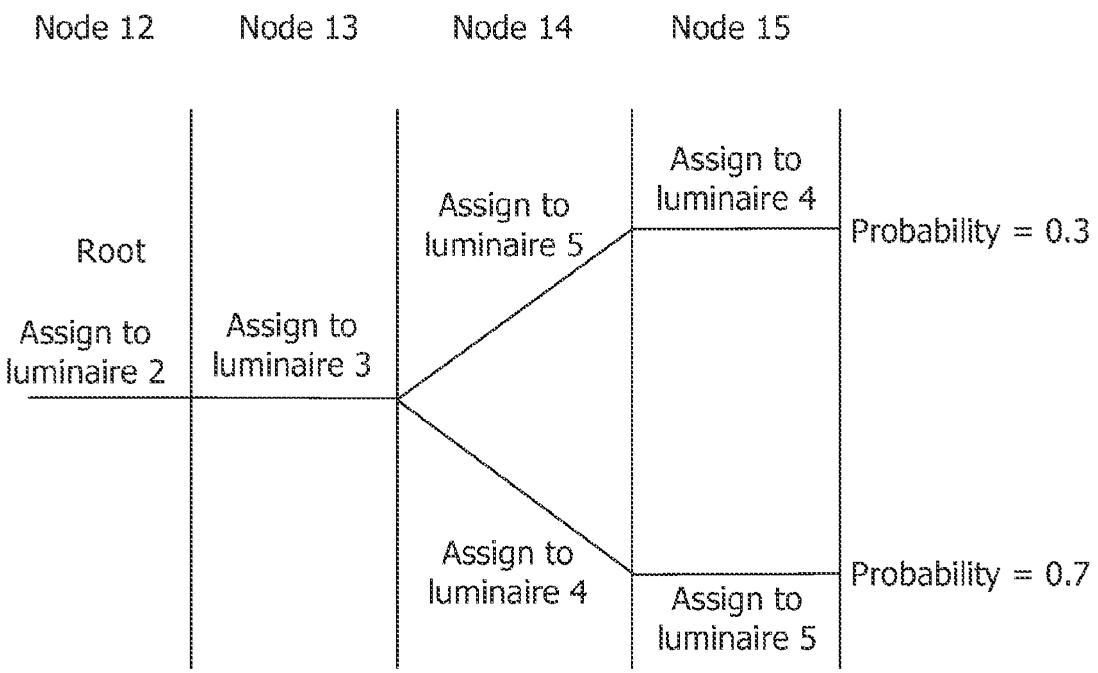
FIG. 13 is an illustration of the decision tree of FIG. 11 following a pruning process.

FIG. 13 shows the probability tree of FIG. 11 following a pruning process. In the pruning process, all branches carrying hypotheses with a probability of less than 0.1 have been pruned out. Branches carrying parent hypotheses whose children have all been eliminated have also been pruned out and the probabilities of the remaining hypotheses have been normalised.

The pruning process results in a firm decision to assign the second node 13 to the second luminaire 3. By continuing to grow and prune the decision tree in this manner, the algorithm 36 is able to resolve the assignment decisions for all nodes 12-19 in the network 11.

Referring again to FIG. 3, as with the placement algorithm 21, the assignment algorithm 36 is adapted such that it may be implemented by the laptop computer 22 or PDA as previously described.

The computer 22 communicates with the network 11 through the gateway interface by means as discussed previously. In an alternative embodiment of the invention, as with the placement algorithm 21, the algorithm 36 is adapted such that it may be implemented by computer hardware which is integrated into the wireless communication network 11.

The computer 22 uses the range data provided by the network 11 to implement the placement algorithm 21 and assignment algorithm 36 to assign the nodes 12-19 to the luminaires 2-9. The communication nodes 12-19 are provided with storage means such that they are able to store the assignment configuration. Hence, the nodes 12-19 are able to implement the stored configuration each time the lighting array 1 is switched on.

Figure 14:
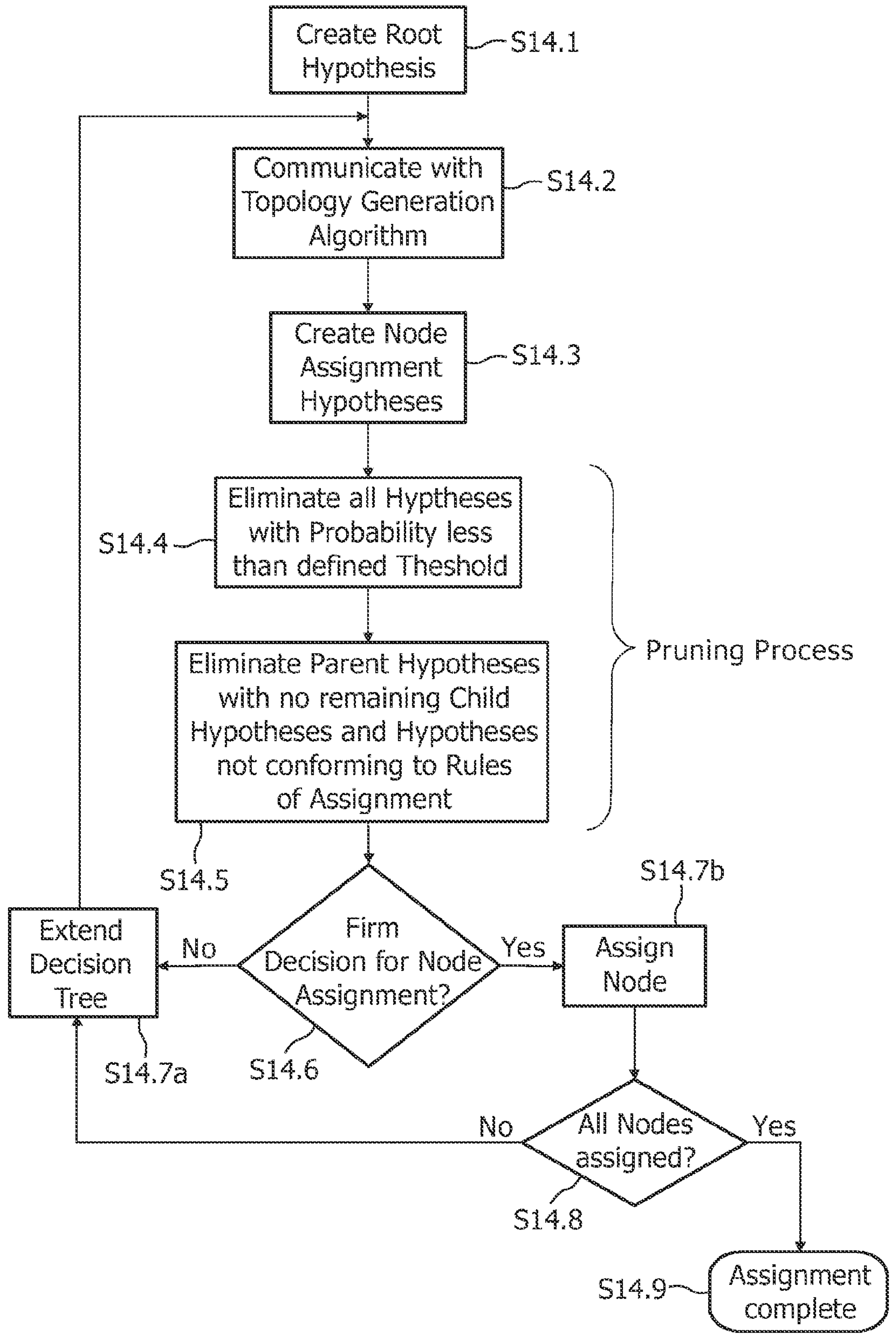
FIG. 14 is a flow diagram showing the steps associated with the operation of an assignment algorithm according to the present invention.
Figure 15:
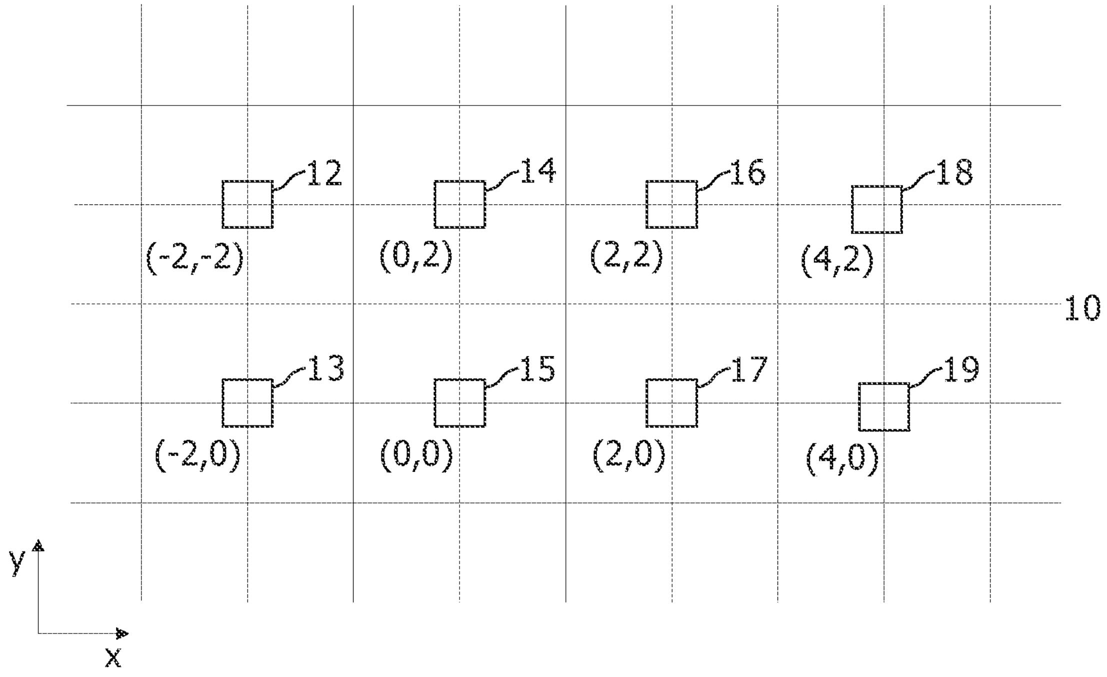
FIG. 15 is a diagram illustrating a completed assignment of communication nodes to the positions of luminaires in a wireless lighting array.
Figure 16:
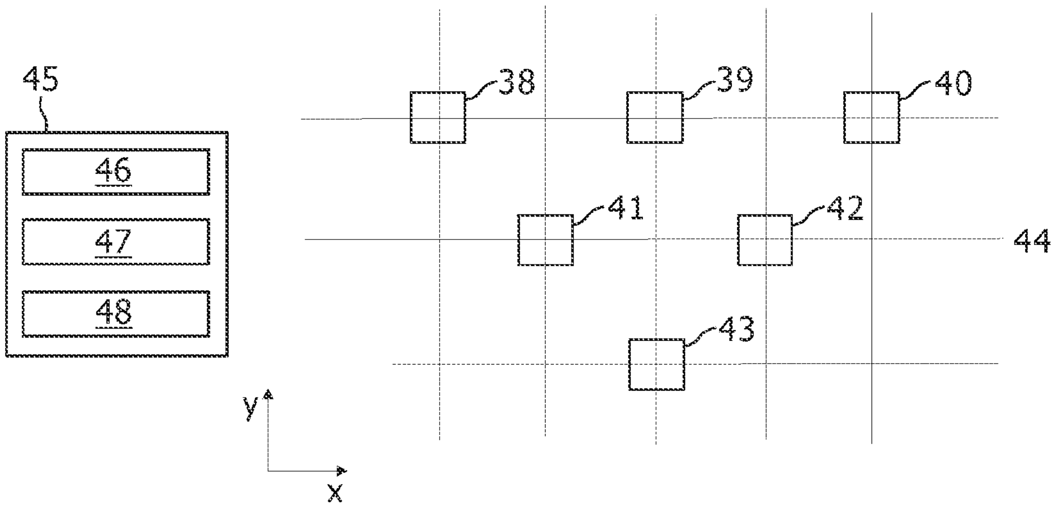
FIG. 16 is a diagram illustrating the spatial structure of a second wireless communication network and a three-button switch for providing control inputs to the network.

Referring to FIG. 14, S14.1, the assignment algorithm 36 creates a root carrying a first hypothesis, as shown in FIG. 11, which represents the assignment of the first node 12 to the first luminaire 2. Referring to FIG. 3 and FIG. 14, S14.2, the algorithm 36 then communicates with the placement algorithm 21 to derive the position of the second node 13. This is carried out by the process illustrated in FIG. 5, whereby the placement algorithm 21 constructs a circle 31 around the first node 12.

Referring to FIG. 14, S14.3, and FIG. 11, the assignment algorithm 36 uses the circle 31 to create hypotheses for the assignment of the second node 13. The algorithm 36 constructs branches in the decision tree to carry hypothesis for each plausible assignment position on the lattice 10.

In this example, there are two assignment hypotheses, which correspond to the positions of luminaires 3,4. In the case of the second node 13, the probability assigned to each hypothesis by the algorithm 36 is directly proportional to the distance between the circumference of the circle 31 and the luminaire 3,4 which the hypothesis represents.

In the cases of further nodes, for which the placement algorithm 21 is able to return a more precise node position, as discussed in relation to FIGS. 6 and 7, the probability assigned to each hypothesis is directly proportional to the distance between the node's derived position and the luminaire 2-9 which the hypothesis represents. For example, if there are two possible assignment positions for a particular node 12-19, the probability of each may be calculated by the following equation.

$$Pr(H_n) = 1 - \frac{D_n}{D_{total}}$$

Where:

$Pr(H_n)$ is the probability of hypothesis n, $D_n$ is the distance from the node's derived position to the position represented by hypothesis n, $D_{total}$ is the sum of the distances for all hypotheses.

Alternatively, the probability assigned to each hypothesis may be calculated independently of the distances to the positions represented by sibling hypotheses. For example:

$$Pr(H_n) = Pr(H_{parent}) \times \frac{1}{D_n}$$

Where:

$Pr(H_{parent})$ is the probability of the parent of hypothesis n.

With this alternative approach, if $D_n$ is very small ($D_n$<<1), $Pr(H_n)$ may become very large and unfairly dominate the balance of probabilities. Therefore, it is necessary to eliminate small values of $D_n$ before calculating $Pr(H_n)$. Eliminating small values of $D_n$ will also prevent a divide by zero exception. Once the probabilities for all hypotheses of a particular generation have been calculated, i.e. all siblings and cousins, their probabilities may be normalised. The probabilities may then multiplied by the probabilities of their parent hypotheses, as previously discussed.

The algorithm 36 may also take additional factors into consideration when considering the probabilities of hypotheses. Such factors may include, for example, quality indicators from the underlying range data.

Referring to FIG. 14, S14.4, following the construction of assignment hypotheses, the assignment algorithm 36 assesses whether any of the hypotheses have a probability of less than a defined threshold value. This assessment may be made either before or after multiplying the hypothesis with the probability of its parent, as previously discussed. Branches carrying hypotheses with a probability of less than the threshold value are pruned out of the decision tree. In this embodiment of the invention the threshold probability is 0.1, however, in another embodiment it may be any value less than 1.

In a further embodiment of the invention, the threshold may be calculated as a percentage. For example, a hypothesis may be eliminated if its probability is less than 1% of the probability of its most likely sibling or cousin hypothesis.

Upon the elimination of all hypotheses having a probability less than 0.1, the assignment algorithm 36 progresses to S14.5. At this stage, the algorithm 36 prunes out branches carrying parent hypotheses who no longer have surviving children. The result of the pruning process for the first four nodes 12-15 is shown in FIG. 13.

The algorithm 36 then checks the revised decision tree, in S14.6, to ascertain whether the above described pruning process has resulted in any firm node assignment decisions, as previously described in relation to FIG. 13.

If the answer is no, the algorithm 36 moves to S14.7*a* and extends the decision tree. The algorithm 36 is configured to communicate the remaining possible assignment positions for the second node 13 back to the placement algorithm 21, such that the placement algorithm 21 may then derive positions for the third node 14.

Due to the derivation of a node's position being dependent on the assignment positions of previous nodes, the derived position of the third node 14 will be different for each branch of the tree, as illustrated by FIGS. 8-10.

Alternatively, if the answer is yes, the algorithm 36 moves to S14.7*b* and assigns the relevant node to the relevant luminaire. It then progresses to S14.8 and ascertains whether all of the communication nodes 12-19 in the network 11 have been assigned to luminaires 2-9 in the lighting array 1.

If nodes are yet to be assigned, the algorithm 36 moves to S14.7*a* and extends the decision tree as previously described. However, if all nodes are assigned, the algorithm 36 moves to S14.9 where the assignment of nodes 12-19 is finalised.

In this way, the algorithm 36 is able to establish the correct spatial structure of the network 11, leading to the successful auto-commissioning of the lighting array 1. It will be appreciated that, although the placement algorithm 21 has been illustrated and described as a separate computer program, in another embodiment of the invention the features of the placement algorithm 21 may be integrated as part of the assignment algorithm 36.

wireless nodes 38-43 which are arranged on a lattice 44. The intersections of the lattice 44 define an arbitrary x-y coordinate scale. However, in another embodiment of the invention, the wireless nodes 38-43 may be arranged in x-y-z space. The positions of the nodes 38-43 in the communication network 37 are already correctly ascertained, therefore, there is no uncertainty in the network structure. The correct positions of the nodes 38-43 may be provided by the previously described assignment process, or may be entered manually or by some other known method.

The network of nodes 38-43 are adapted such that each of them is able to communicate with a three-button switch 45, which comprises buttons 46-48. In this embodiment of the invention, communication between the switch 45 and the network 37 is via serial or Ethernet cable. However, in another embodiment of the invention, information is transferred wirelessly.

The wireless network 37 is configured to provide a means for communication between a set of luminaires in a lighting array. Each node is assigned to a particular luminaire and provides a means to control the luminaire's operation. Alternatively, in another embodiment, the network 37 may be configured to provide a means for communication in a different type of system.

In order to commission the node network 37, the nodes 38-43 are divided into three groups 49-51 such that each group 49-51 is controlled by a particular button 46-48 on the three-button switch 45. For the lighting system to work correctly, it is important that the nodes 38-43 are divided into sensible spatial groupings so that luminaires in a particular area of the lighting array are all controlled by the same switch or sensor and, hence, behave in a similar manner.

Figure 17:
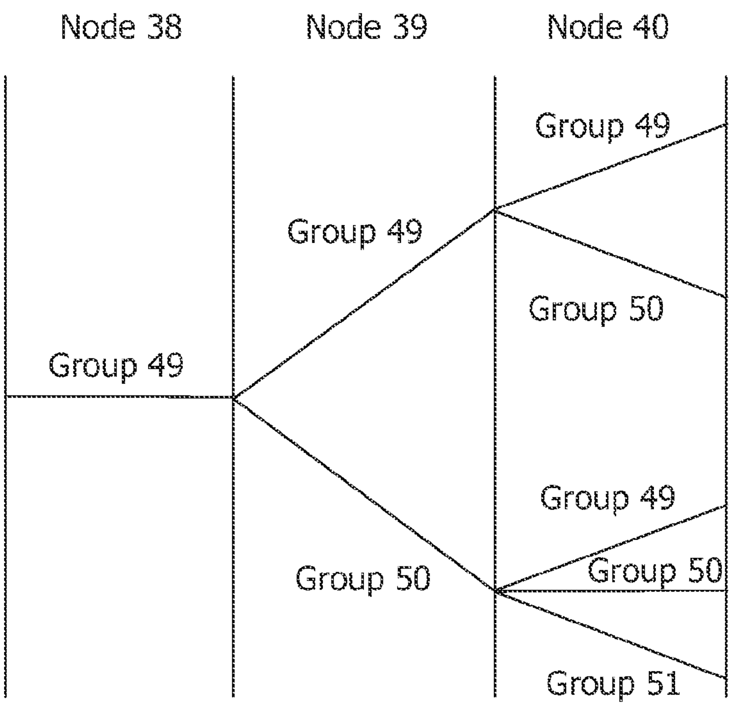
FIG. 17 is an illustration of a decision tree representing the assignment of a first three wireless communication nodes to control groups.
Figure 18:
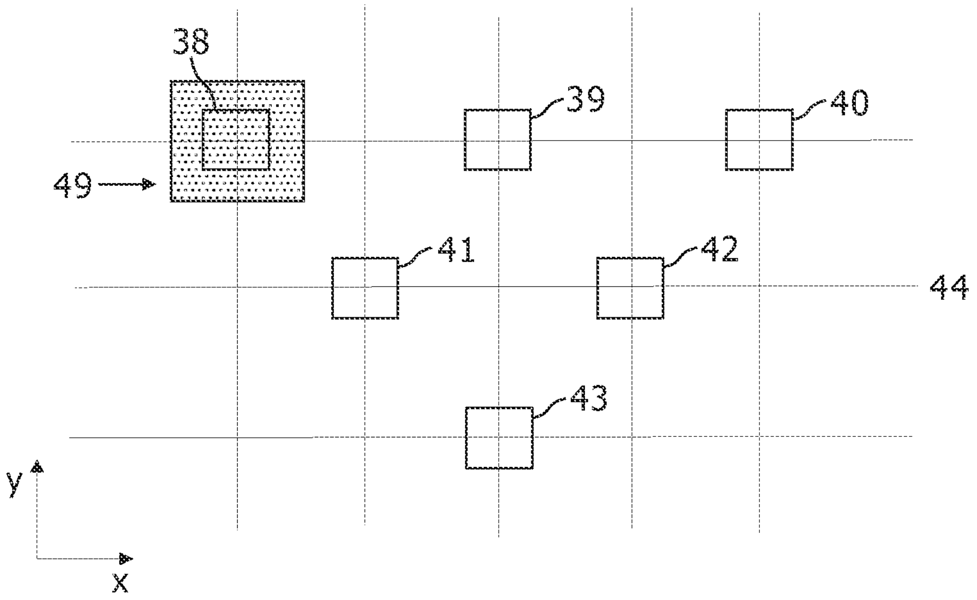
FIG. 18 is a diagram illustrating the assignment of a first wireless communication node to a first control group.

Referring to FIG. 17 and FIG. 14, S14.1, the assignment algorithm 36 creates a root to carry the hypothesis for the assignment of the first node 38 to the first group 49. This assignment is shown in FIG. 18. The algorithm 36 then creates branches to carry child hypotheses for the assignment of the second node 39, as shown in S14.3.

Figure 19:
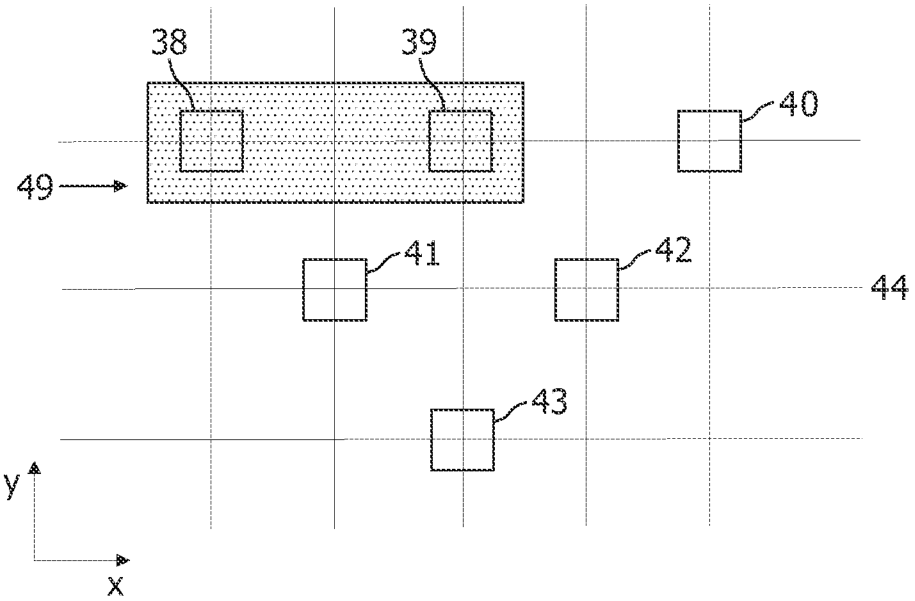
FIG. 19 is a diagram illustrating the assignment of first and second wireless communication nodes to a first control group.
Figure 20:
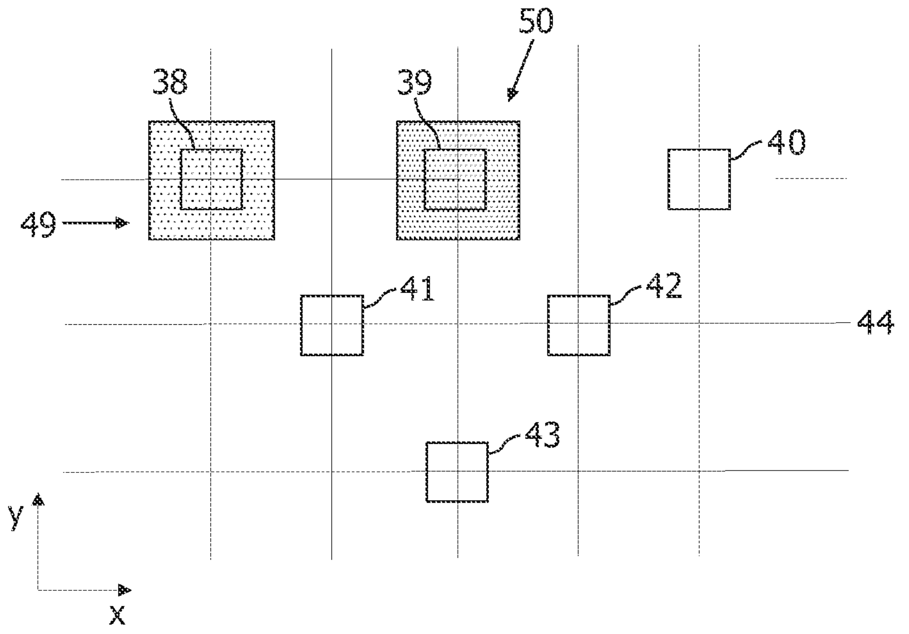
FIG. 20 is a diagram illustrating the assignment of a first wireless communication node to a first control group and the assignment of a second wireless communication node to a second control group.

The child hypotheses assign the second node 39 either to the first group 49, as shown in FIG. 19, or to the second group 50, as shown in FIG. 20. The calculation of probability for each hypothesis against its siblings and cousins is made according to the relevant merit of each resulting group.

In one embodiment of the invention, the algorithm 36 joins the nodes of each group together by drawing a line which connects them together. In this embodiment, the probability assigned to the hypothesis for each group is calculated according to the statistics of the group. These statistics may include, for example, the standard deviation or variance in the distance between member nodes, the length of the line and the number of member nodes.

In another embodiment of the invention, the assessment of merit is made according to the relative proximity of member nodes. As discussed with the first application of the algorithm 36, the probability of each child hypothesis additionally inherits the probability of its parent hypothesis.

The algorithm 36 then progresses to S14.4 in which branches of the decision tree are pruned out if their hypotheses have a probability below a defined threshold value. Similarly, referring to S14.5, the branches carrying parent hypotheses who have no surviving children are also pruned out of the tree.

The algorithm 36 then checks, in S14.6, as to whether the pruning process has resulted in any firm assignment decisions. If the answer is yes, the relevant node 38-43 is assigned to the relevant group 49-51 and the algorithm 36 proceeds to check whether all nodes have been assigned to groups. Alternatively, if there are no firm assignment decisions, the algorithm 36 extends the decision tree, in S14.7*a*, and returns to S14.3.

Referring back to FIG. 17, the assignment algorithm 36 then considers the assignment of the third node 40 in the network 37. The child hypotheses representing the assignment of the third node 40 may associate the node 40 either with the first group 49, the second group 50 or the third group 51.

In this embodiment of the invention the rules of assignment dictate that, in order that the nodes 38-43 form sensible spatial groupings, nodes may only be assigned to adjacent groups. Therefore, if the second node 39 is assigned to the second group 50, the third node 40 may only join the second group 50 or the third group 51. It may not join the first group 49 because the second node 39 stands in its way. The branches carrying hypotheses which do not conform to this assignment rule are pruned out of the decision tree in the pruning process of S14.4 and S14.5.

Figure 21:
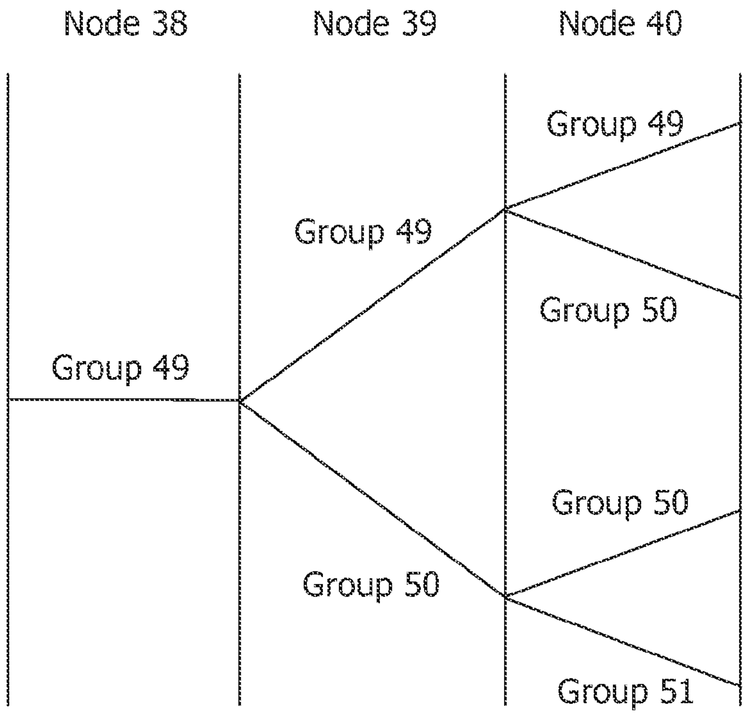
FIG. 21 is an illustration of a decision tree representing the assignment of first three wireless communication nodes following a pruning process.

FIG. 21 shows the hypothesis tree of FIG. 17 following the pruning process. The branch carrying the hypothesis for the combination of first node 38 to first group 49, second node 39 to second group 50 and third node 40 to first group 49 breaks the rules of assignment and has been pruned out of the tree.

The final three nodes 41-43 may be assigned by extending the decision tree of FIG. 20. An example of a decision tree for the assignment of all six nodes 38-43 in the network 37 is shown in FIG. 22. In this example, so as to give a clear picture of the decision tree, branches have only been pruned out if their hypotheses break the rules of assignment as previously discussed.

Figures 23, 24:
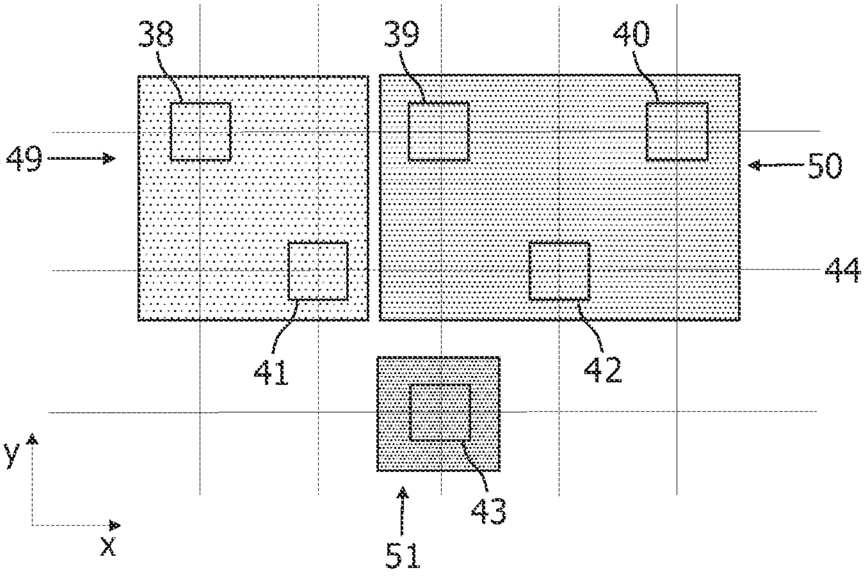
FIG. 23 is a diagram illustrating a completed assignment of wireless nodes to control groups.
FIG. 24 is an illustration of the decision tree of FIG. 21 following a pruning process.

FIG. 23 shows an example of a completed assignment, in which branches carrying hypotheses with a probability of less than the defined threshold have also been pruned out. All nodes 38-43 have been assigned to groups 49-51. The corresponding decision tree, in which all branches have been pruned out except those carrying the final assignment hypotheses, is shown in FIG. 24.

In this way the algorithm 36 is able to assess the merits of all possible spatial groupings of nodes 38-43 before it divides the network 37 into groups 49-51. The algorithm 36 may be implemented as with the previously discussed application, however, because the structure of the network 37 is already established, the structure may be communicated to the algorithm 36 upon initialisation. Therefore, the algorithm 36 does not need to continuously correspond with a placement algorithm as with the previously described application.

It is clear that all the features described for the first embodiment could be adapted to this second embodiment.

Although claims have been formulated in this application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of assigning wireless nodes, which are in a derivable spatial arrangement, to positions in an array of positions, the wireless nodes being in communication with each other and with a control processor, the method comprising:

receiving, at the control processor from each wireless node, a range determined by the wireless node between itself and each other wireless node;

deriving, at the control processor, the spatial arrangement of the wireless nodes in relation to the array of positions, based on the range received from each wireless node, wherein the array of positions is unknown to the wireless nodes and known to the control processor, said deriving realized by:

building a decision tree to represent a hypothesis for the assignment of a first of said nodes to a first of said positions;

extending said decision tree to represent hypotheses for the assignment of each further node to a plurality of said positions;

assigning a probability to each of said hypotheses, wherein the probability is based on the spatial arrangement of the wireless nodes;

selecting one of said positions for each of said nodes based upon the probabilities of said hypotheses and assigning each of said nodes to its selected position.

2. The method according to claim 1 including representing the hypothesis for the assignment of the first of said nodes by a root of the decision tree and representing hypotheses for the assignment of each further node by branches stemming from the root, wherein the hypotheses for the assignment of each further node are represented as children of a parent hypothesis representing the assignment of the previous node.

3. The method according to claim 2 including calculating the probability of each hypothesis for a particular further node as proportional to the probability of its parent hypothesis.

4. The method according to claim 2 including calculating the probability of each hypothesis for a particular further node as the product of the probability of its parent hypothesis and its probability against sibling hypotheses representing the assignment of said particular node to an alternative position.

5. The method according to claim 2 including calculating the probability of each hypothesis for a particular node as proportional to the distance between the particular node's position in said derived arrangement and the position represented by the hypothesis.

6. The method according to claim 2 including calculating the probability of each hypothesis for a particular node as proportional to the distances between said particular node's position in said derived arrangement and positions represented by its sibling hypotheses.

7. The method according to claim 2 including calculating the probability of each hypothesis for a particular node as inversely proportional to the distance between the particular node's position in said derived arrangement and the position represented by the hypothesis.

8. The method according to claim 2 including eliminating parent hypotheses with no surviving child hypotheses from the decision tree.

9. The method according to claim 1 including eliminating hypotheses having a probability of less than a defined threshold from the decision tree.

10. The method according to claim 1 including assigning nodes having only one assignment hypothesis to the position represented by that hypothesis.

11. The method according to claim 1 wherein said array of known positions corresponds to an array of positions on a lattice structure.

12. A method of assigning wireless nodes in a derivable spatial arrangement to groups in an array of groups, the wireless nodes being in communication with each other and with a control processor, the method comprising:

receiving, at the control processor from each wireless node, a range determined by the wireless node between itself and each other wireless node;

deriving, at the control processor, the spatial arrangement of the wireless nodes in relation to the array of groups, based on the range received from each wireless node, wherein the array of groups is unknown to the wireless nodes and known to the control processor, said deriving realized by:

building a decision tree to represent a hypothesis for the assignment of a first of said nodes to a first of said groups;

extending said decision tree to represent hypotheses for the assignment of each further node to a plurality of said groups;

assigning a probability to each of said hypotheses, wherein the probability is based on the spatial arrangement of the wireless nodes;

selecting one of said groups for each of said nodes based upon the probabilities of said hypotheses and assigning each of said nodes to its selected group.

13. The method according to claim 12 wherein said wireless nodes are electrically powered communication nodes in a wireless communication network.

14. The method according to claim 13 wherein said wireless communication network is configured to control the operation of a wireless lighting array.

15. The method according to claim 12 including establishing said derived arrangement from ranges between pairs of said wireless nodes wherein said ranges are calculated from Received Signal Strength Indication (RSSI).

16. The method according to claim 12 including establishing said derived arrangement from ranges between pairs of said wireless nodes wherein said ranges are calculated from Time-of-Flight measurements.

17. A non-transitory computer readable medium having one or more executable instructions stored thereon, which when executed by a digital processing system cause the digital processing system to perform a method of assigning wireless nodes, which are in a derivable spatial arrangement, to positions in an array of positions, the wireless nodes being in communication with each other and with the digital processing system, the method comprising:

receiving, from each wireless node, a range determined by the wireless node between itself and each other wireless node;

deriving the spatial arrangement of the wireless nodes in relation to the array of positions, based on the range received from each wireless node, wherein the array of positions is unknown to the wireless nodes and known to the digital processing system, said deriving realized by:

building a decision tree to represent a hypothesis for the assignment of a first of said nodes to a first of said positions;

extending said decision tree to represent hypotheses for the assignment of each further node to a plurality of said positions;

assigning a probability to each of said hypotheses, wherein the probability is based on the spatial arrangement of the wireless nodes; and selecting one of said positions for each of said nodes based upon the probabilities of said hypotheses and assigning each of said nodes to its selected position.

18. A non-transitory computer readable medium having one or more executable instructions stored thereon, which when executed by a digital processing system cause the digital processing system to perform a method of assigning wireless nodes, which are in a derivable spatial arrangement, to groups in an array of groups, the wireless nodes being in communication with each other and with the digital processing system, the method comprising:

receiving, from each wireless node, a range determined by the wireless node between itself and each other wireless node;

deriving the spatial arrangement of the wireless nodes in relation to the array of groups, based on the range received from each wireless node, wherein the array of groups is unknown to the wireless nodes and known to the digital processing system, said deriving realized by:

building a decision tree to represent a hypothesis for the assignment of a first of said nodes to a first of said groups;

extending said decision tree to represent hypotheses for the assignment of each further node to a plurality of said groups;

assigning a probability to each of said hypotheses, wherein the probability is based on the spatial arrangement of the wireless nodes;

selecting one of said groups for each of said nodes based upon the probabilities of said hypotheses and assigning each of said nodes to its selected group.

* * * * *